Sept. 20, 1966          L. E. TILLERY          3,273,916
UNITARY FLEXIBLE METALLIC CONNECTOR
Filed March 13, 1961
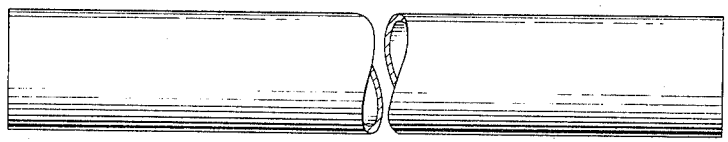
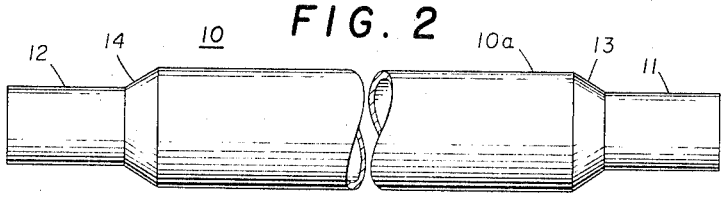
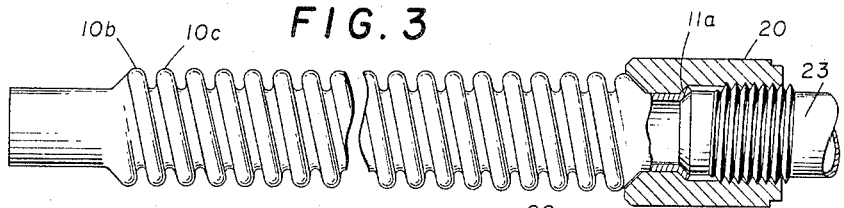
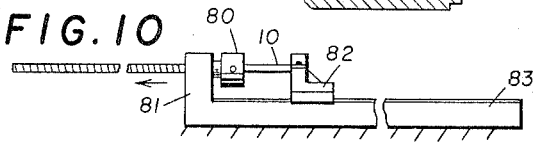
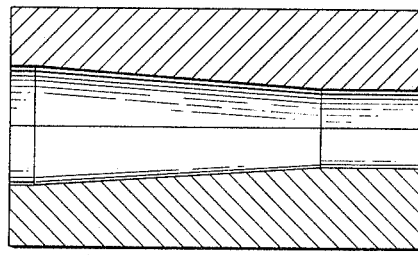
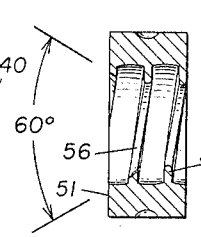
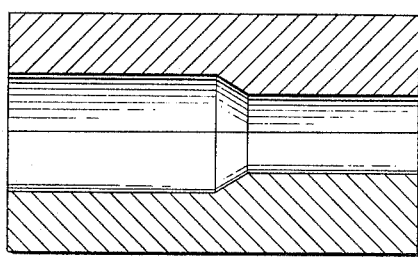
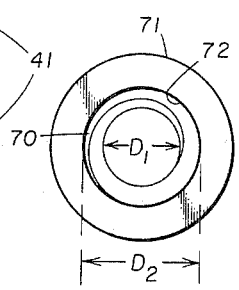

United States Patent Office 3,273,916
Patented Sept. 20, 1966

3,273,916
UNITARY FLEXIBLE METALLIC CONNECTOR
Lloyd E. Tillery, 1507 Melbourne, Dallas, Tex.
Filed Mar. 13, 1961, Ser. No. 95,204
6 Claims. (Cl. 285—226)

This invention relates to a flexible metallic coupling and to a method and system for forming a unitary flexible coupling unit.

In prior devices, corrugated metallic tubing has been formed by passing a tube having a relatively thin wall through dies to produce corrugations therein which are spiraled along the length of the tube. Upon annealing, a flexible corrugated member results. Connections to the ends of such flexible members have been completed by way of end units which are soldered, welded or otherwise mechanically joined to the corrugated portions of the flexible corrugated member. The environments in which such couplings are used have been such as to cause deterioration of the joint or materials forming the joint between the end units and the corrugations. Resultant failures have been disastrous where leakage is caused in systems carrying water, combustible gases or explosive mixtures.

In accordance with the present invention, there is provided a unitary flexible connector having a spiraled central section with end portions mechanically worked to a substantially reduced diameter to provide a smooth walled, high strength section for connecting to further elements of the system. Further in accordance with the present invention, there is provided a method of forming a unitary flexible coupling which comprises mechanically working the ends of a section of tubing to reduce the diameter thereof to a predetermined degree for a restricted length on each end and to form a substantially abrupt transition between the reduced diameter section and the body of the tubing. There are then progressively formed spiral corrugations beginning at one of said junctures and extending to the other. The diameter of corrugations is progressively reduced by increasing the working depth beginning at said juncture and continuing to the other juncture while reducing the pitch of the spiral extending along the tubing. The tubing is annealed after completing the corrugation thereof. The ends may then be flared into a coupling nut to complete the unitary coupling.

In a further aspect of the invention, there is provided a system for forming a flexible coupling member from a thin walled metallic tube and includes a unitary die having an internally spiraled thread of root diameter slightly in excess of the diameter of the tubing. The crown diameter corresponds with the minimum diameter of the corrugations to be formed in the tube. The die is characterized by about one-half of the lead turn on the thread therein being tapered from the crown diameter to the root diameter for starting the same onto thin walled tubing without damage thereto.

For a more complete understanding of the present invention and for further objects and advantages thereof, reference may now be had to the following description taken in conjunction with the accompanying drawings in which:

FIG. 1 is a view of a tubing;
FIG. 2 illustrates the tubing of FIG. 1 with ends thereof reduced in diameter;
FIG. 3 illustrates the tube of FIGS. 1 and 2 with the body portion corrugated;
FIG. 4 illustrates a first pair of swaging dies;
FIG. 5 illustrates a second pair of swaging dies;
FIG. 6 illustrates a first corrugating die;
FIG. 7 illustrates a second corrugating die;
FIGS. 8 and 9 illustrate a modified form of corrugating die; and
FIG. 10 illustrates the use of a lathe unit in forming a section of corrugated tubing.

Referring now to FIG. 1, a section of tubing 10 is cut to a length somewhat longer than that desired for a finished coupling. The excess length is provided in order to accommodate the corrugations thereof. The tubing preferably is of thin wall stock having a wall thickness of the order of 0.014 inch for ¾", ½" or ⅜" tubing. For the purpose of the present description an example of ¾" tubing (0.875" O.D.) will be set forth in detail.

Coupling elements formed from such tubing are adaptable for use as coupling members for gas, air, liquid appliances or the like. It will be appreciated that the invention is not limited to such devices but that larger diameter corrugated elements of the order of several or more inches in diameter may be formed and serve as vibration-isolating units and the like.

Referring now to FIG. 2, there is illustrated the section of tubing 10 after it has been mechanically worked at the ends 11 and 12 to form smooth walled end sections of substantially reduced diameter. The end sections 11 and 12 are mechanically worked by swaging them to provide reduced end extensions of uniform diameter coupled to the central section 10a by transition sections 13 and 14 which subtend an angle of about 90°, i.e., the zones 13 and 14 slope at 45° with respect to the surfaces of the extensions 11, and 12 and the central section 10a.

In FIG. 3 the tubing is illustrated with the central section having been worked to form corrugations 10b, 10c, etc. The corrugations are in the form of a spiral having a pitch of about four per inch and with a depth such that the maximum diameter, i.e., at the crown of a given corrugation, is about the same diameter as the tubing of FIG. 1. The diameter of the tube at the root of the spiral corresponds generally with the diameter of the ends 11 and 12.

In accordance with one embodiment of the invention a nut such as nut 20 is provided on each end of the tube (only one nut being shown). The nut 20 is formed at the rear to conform with the transition zones 13 and 14, that is, the nut is reamed at a 45° angle and is fitted over the ferrule 11 with the end 11a flared to be seated on the internal sloping shoulder 21 of the nut 20. Nut 20 is internally threaded at the mouth thereof and is thus adapted to be connected to a supply or fixture nipple 23. The nut 20 and the section 11 are so dimensioned as to permit the nut 20 to turn freely on the ferrule while at the same time substantially encompassing the sloping zone 13 thereby to present a substantially continuous enlarged diameter tubing section from the end of one of the coupling or fare nuts to the flare nut at the other end.

In working the tube 10 of FIG. 1 to form the completed product of FIG. 3, there will first be employed a swaging unit into which the ends of the tube of FIG. 1 are successively fed. The swaging unit preferably will be provided with two pairs of dies. The first pair of dies may be of the type as indicated by the dies 40, FIG. 4.

The swaging machine may be of the type manufactured and sold by the Torrington Company, Torrington, Connecticut, and will employ in succession each of two pairs of dies 40 and 41. The first pair of dies may be of the type indicated in FIG. 4 where the dies 40 are made in two parts and mate along a common plane. The swaging machine serves to produce relative rotation between a tube inserted into the dies 40 and to reciprocate the elements of the dies 40 toward and away from one another a plurality of times during each cycle of rotation relative to the tube. The dies 40 have a central aperture extending therethrough.

At the left end, FIG. 4, the aperture corresponds in diameter with the diameter of the tube 10. At the right end, FIG. 4, the aperture in dies 40 corresponds with the diameter of the ferrules 11 and 12, FIG. 2. The transition portion tapers gently from the larger diameter down to the smaller diameter.

The second pair of dies 41, FIG. 5, is similar to dies 40, FIG. 4, except that the transition portion is much shorter and the taper thereof is correspondingly steeper, preferably of the order of 45° over a 0.25″ transition section.

Such dies employed in a swaging machine reduce the diameter of the tube ends in two successive operations to the configuration illustrated in FIG. 2 to produce high strength sections for connecting to further elements of the system by forming wall sections of increased strength in the course of the swaging operations.

Tubes formed at the ends as illustrated in FIG. 2 are then fed into a corrugating machine which like a metal working lathe is fitted with a set of dies such as illustrated in FIG. 6. As hereinafter described, the die 50 of FIG. 6 may be fitted in a chuck. The end section or ferrule 11 at the end of the tube of FIG. 2 is then fed through the chuck-mounted die of FIG. 6. The end of the ferrule 11 is clamped into a bracket which is slidable along the ways of the lathe to keep the tube from turning. The lathe is then energized so that the die 50 rotates, serving the die 50 onto the sloping portion of the tube as at the zone 13. The die of FIG. 6 in the form illustrated is provided for receiving tubing having an outside diameter of 0.875″. It has a 3-thread per inch pitch and a diameter at the root of the spiral thread of .703″. Tubing such as the unit of FIG. 2 is then run completely through the die as the lathe is energized. The tubing is then run through a second die 51, FIG. 7. This die has a pitch of four threads per inch and thus serves to crimp the tubing, drawing it to shorter overall length, while at the same time reducing the diameter of the tubing at the roots of the spiral thread therein.

The dies 50 and 51 formed in accordance with the present invention are such that they will serve themselves onto the tubing formed as in FIG. 2 and are such that there is not required any driving force other than the rotation of the die to move the tubing therethrough. All that is required is that the end 11, the lead end, be clamped to oppose the rotational forces developed by the rotation of the die as it serves itself along the length of the tubing. The dies 50 and 51 are turned from a stock which is then surface hardened. As illustrated in FIGS. 6 and 7, the threads therein are substantially rectangular and are characterized by an inwardly projecting ridge whose sides are nearly perpendicular to the axis of the bore and whose crown is rounded. The ridge has a width of about one-third the spacing between adjacent ridges. In the die 50 the ridge makes one and one-half turns in about ½,″ for a pitch of three turns per inch.

In the die 51, FIG. 7, having a pitch of four turns per inch, in common with the die 50, the thread has a width of about one-third the spacing between turns thereof. The height of the thread is substantially greater than in die 50 to deepen the corrugations initiated thereby.

Thus, a pair of swaging dies 40 and 41 and a pair of corrugating dies 50 and 51 may be employed to perform all mechanical working operations on tube 10 to provide a unitary member having end sections extending from each end of an intermediate corrugated section.

Dies 50 and 51 are one piece elements adaptable for use separately so that a corrugating operation for a given length of tube would involve passing the same first through die 50 and then through die 51. Dies 50 and 51 may be mounted in a common head so that the tube could be completed with a single pass therethrough. The single element character of the die 50 or die 51 simplifies the construction thereof and enhances the operation so that the surfaces of the corrugations are uniform and smooth, thus minimizing points for developing stress which might cause failure therein.

In the dies of FIG. 6 the crown 52 of the internal spiral 53 has a diameter of .093″. The spacing between the opposing faces of spiral 53 and spiral 54 is .24″. While the valley between the spirals 53 and 54 is shown but slightly arched, in practice it will be preferred that such portions be rounded with the radius equal to one-half the spacing between the spirals 53 and 54 as embodied in FIG. 7. This will permit forming of the dies by use of a suitable tap and will not require a turning operation.

In forming the die of FIG. 6, a short length of stock is first center-bored to the inner diameter of the spirals 53 and 54. The latter bore is then reamed at an angle of the order of 60° to a diameter slightly in excess of the diameter of tube 10 of FIG. 1. Where tube 10 is .875″ in diameter, the reamed opening in the left hand face of the die of FIG. 6 is .885″. After it is reamed, a tap passed through the die forms the necessary threads therein.

With the tapered opening leading to the threads, the leading thread will itself have a tapered edge at a 60° angle as illustrated in FIG. 6 so that the die will receive the tube 10 even without preworking of its ends and at the same time without damaging the tube since the working area of the die is relatively small, thereby minimizing the necessary torque placed on the unfinished wall section. If the lead provided by the tapered opening is not present, it has been found that the end of the tubing is deformed and damaged to become unusable. The taper from full diameter to full thread depth is formed within about one-half turn and provides a substantially abrupt working zone so that the total die length may be limited to but a few turns. The die itself for 0.825″ stock need be no more than 0.5″ long. Use of a short die minimizes the forces necessary to complete the corrugating operation.

In passing tubing of 0.875″ diameter through the die of FIG. 6, the diameter will be reduced to about .825″. Following the first pass, the tube 10 is then passed through die 51 of FIG. 7 which serves primarily to fold the corrugations tighter upon one another, i.e., from three turns per inch to four turns per inch. In this operation the diameter across the crown of the corrugations is increased approximately to the original .875″. The dies of FIGS. 6 and 7 may be turned, threaded or tapped from a suitable metallic stock so that they are very inexpensive in manufacture and yet provide for positive control in assuring production of a uniformly corrugated tube.

In the die of FIG. 7 the same feature is present in that the first turn of the spiral therein is tapered at a 60° angle. Furthermore, the dimensions are substantially different. The thickness of the spiral is .062″. The spacing between spirals 55 and 56 is .188″. It is to be understood that where dimensions are given above they apply to a specific unit and are suggestive only of units of other dimensions.

Referring now to FIGS. 8 and 9, there is illustrated a modification of the invention in which the first turn 70 of the screw in die 71 is diametrically tapered to form a spiral-helix section rather than being tapered by sloping the crown. In this embodiment an opening 72 is formed in the entry side of the die of 0.885″ diameter as to provide for clearance for the tube of FIG. 1. In the first half turn 70, the diameter of the same thread is tapered from the root diameter D1 to the clearance diameter D2. It is also tapered in thickness as it runs out into the clearance opening 72. Thus, the dies of FIG. 6 and FIG. 7 are tapered conically. The die of FIGS. 8 and 9 is tapered radially so that in either case a tube having a blank end may be fed into the spiral-helix half turn without damage.

The die 71 of FIGS. 8 and 9 is illustrated as having a pitch of three turns per inch. A similar die having a pitch of four turns per inch may be employed for a second pass of a given tubing to complete a corrugating operation. The pitch of the screw in a single die may be varied from one limit to the other so that a complete operation is performed in one pass of a tube through a single die or as above explained in connection with FIGS. 6 and 7 with two dies carried by a single head.

In either case the corrugating die may be mounted in a chuck 80 as shown in FIG. 10 and turned by a lathe apparatus 81 to serve itself onto the tubing 10. Tube 10 is clamped at one end in a follower 82 and the other end is started into the die. Once started the die in chuck 80 pulls the tube as the corrugation is extended therealong. Follower 82 prevents tube 10 from rotating and is mounted freely to slide along a way in the bed 83 of the lathe 81.

The coupling flare nuts, such as flare nut 20, are beveled on the end thereof adjacent the corrugations. As shown in FIGS. 2 and 3, the beveled transition zone has an axial length approximately equal to the pitch of the spiral grooves. The nuts, complementarily and internally beveled, serve to support and protect the transition zone between the corrugation area and the end extensions from undue stress. While the invention has been shown using an end connection involving a flared nut, other types of end connections may be employed. For example, in fixed systems where ready disconnection is not a requisite but where vibration isolation is desired, conventional fittings with sweated joints may be employed. In such case the extensions 11 and 12 fit into a coupling element wherein solder covers a substantial surface area of the adjacent smooth walls of the extensions 11 and 12 and the inner walls of such coupling elements. Also a connection involving compression by use of a ferrule or sleeve and structures involving beading and the like may be employed for connections to the end sections 11 and 12. Thus, the coupling unit is adaptable for liquid as well as gas appliances.

The dies may also be employed for the corrugation of tubing of different wall thicknesses as well as different diameters than those of the examples used herein. The dies illustrated in FIGS. 6–9 will produce a corrugated tubing having a pitch of four. Corrugations of differing pitch both greater and less than this specific example may be provided through the use of dies provided in accordance with the present invention. For example, by making a pitch substantially higher, spiral bellows may be formed with unitary ends thereon. Couplings of the invention may be employed in high pressure environments by enclosing the same in a braided wire cover which will oppose the pressures therein.

The unitary coupling thus provided is highly advantageous in use in that it completely eliminates the necessity for uniting end elements to the corrugated section itself and thereby eliminates any leakage or failure of the type heretofore proven troublesome.

Having described the invention in connection with certain specific embodiments thereof, it is to be understood that further modifications may now suggest themselves to those skilled in the art and it is intended to cover such modifications as fall within the scope of the appended claims.

What is claimed is:
1. A flexible coupling comprising:
   (a) a central spiral grooved corrugated metallic tube,
   (b) cylindrical end portions each of diameter corresponding approximately with the root of the spiral groove, and
   (c) an annular frusto-conical transition zone between each of said end portions and said central portion with said spiral groove ending in the transition zones, the maximum diameter of said zones corresponding approximately with the crests on the central spiral portion.
2. A flexible coupling comprising:
   (a) a central spiral grooved corrugated metallic tube,
   (b) cylindrical end portions each of diameter corresponding approximately with the root of the spiral groove, and
   (c) an annular frusto-conical transition zone between each of said end portions and said central portion conically tapered on an angle of about 45° relative to the axis of said coupling with said spiral groove ending in the transition zones, the maximum diameter of said zones corresponding approximately with the crests on the central spiral portion.
3. A flexible coupling comprising:
   (a) a central spiral grooved corrugated metallic tube,
   (b) cylindrical end portions each of diameter corresponding approximately with the root of the spiral groove, and
   (c) an annular frusto-conical transition zone between said end portions and said central portion conically tapered and having a length approximately equal to the pitch of said spiral groove, with said spiral groove ending in the transition zones, the maximum diameter of said zones corresponding approximately with the crests on the central spiral portion.
4. A flexible coupling comprising:
   (a) a central spiral grooved corrugated metallic tube,
   (b) cylindrical end portions each of diameter corresponding approximately with the root of the spiral groove,
   (c) an annular frusto-conical transition zone between each of said end portions and said central portion conically tapered on an angle of about 45° relative to the axis of said coupling with said spiral groove ending in the transition zones, the maximum diameter of said zones corresponding approximately with the crests on the central spiral portion, and
   (d) flare nuts encompassing each of said end portions with each of said end portions flared within said nuts.
5. A flexible coupling comprising:
   (a) a central spiral grooved corrugated metallic tube,
   (b) cylindrical end portions each of diameter corresponding approximately with the root of the spiral groove,
   (c) an annular frusto-conical transition zone between each of said end portions and said central portion conically tapered on an angle of about 45° relative to the axis of said coupling with said spiral groove ending in the transition zones, the maximum diameter of said zones corresponding approximately with the crests on the central spiral portion, and
   (d) flare nuts encompassing each of said end portions with each of said end portions flared within said nuts, each of said nuts having internal recesses complementary with the transition zones.
6. A flexible coupling comprising:
   (a) a central spiral grooved corrugated metallic tube,
   (b) cylindrical end portions each of diameter corresponding approximately with the root of the spiral groove,
   (c) an annular transition zone between each of said end portions and said central portion conically tapered on an angle of about 45° relative to the axis of said coupling having a length equal to the pitch of said spiral groove with said spiral groove ending in the beveled transition zones, and
   (d) flare nuts encompassing each of said end portions with each of said end portions flared within said nuts, each of said nuts having beveled internal recesses complementary with the beveled transition zones.

References Cited by the Examiner

UNITED STATES PATENTS

| | | | |
|---|---|---|---|
| 687,464 | 11/1901 | Sullivan | 153—71 |
| 1,052,709 | 2/1913 | Badger | 285—301 |
| 1,797,151 | 3/1931 | Lord | 285—226 |
| 1,896,062 | 2/1933 | Berry | 285—299 X |
| 1,983,468 | 12/1934 | Knab | 138—122 X |
| 2,133,091 | 10/1938 | Gettig | 29—543 |
| 2,157,598 | 5/1939 | Fentress | 153—71 |
| 2,227,817 | 1/1941 | Allen | 29—543 |

(Other references on following page)

UNITED STATES PATENTS

| | | | |
|---|---|---|---|
| 2,357,110 | 8/1944 | Heineman. | |
| 2,365,181 | 12/1944 | Fentress | 285—226 |
| 2,380,952 | 8/1945 | Dewey | 29—543 |
| 2,496,790 | 2/1950 | Guarnaschelli | 153—71 |
| 2,625,055 | 1/1953 | Cudy | 29—543 |
| 2,657,617 | 11/1953 | Hussnigg | 153—71 |
| 2,832,613 | 4/1958 | Farrar | 285—226 |
| 2,833,330 | 5/1958 | Love | 153—71 |
| 2,888,712 | 6/1959 | Kramer et al. | 138—122 X |
| 2,904,356 | 9/1959 | Love | 285—226 |
| 2,936,812 | 5/1960 | Roberts | 138—122 X |

FOREIGN PATENTS

| | | |
|---|---|---|
| 569,929 | 2/1933 | Germany. |
| 627,120 | 7/1949 | Great Britain. |

CARL W. TOMLIN, *Primary Examiner.*

THOMAS F. CALLAGHAN, *Examiner.*

R. K. RAPP, *Assistant Examiner.*